Patented Jan. 25, 1949

2,459,964

UNITED STATES PATENT OFFICE 2,459,964

MANUFACTURE OF MALEAMIC ACID

Ralph Sidney Robinson, Hunt's Cross, near Liverpool, and Ernst Ludwig Humburger, Allerton, Liverpool, England, assignors to Beck, Koller and Company (England) Limited, Speke, Liverpool, England, a British company No Drawing. Application July 29, 1947, Serial No. 764,574. In Great Britain, October 8, 1946

5 Claims. (Cl. 260—534)

This invention relates to the manufacture of maleamic acid.

Anschütz (Annalen, 259, 138 (1890) described the preparation of maleamic acid by the passage of an excess of gaseous ammonia into very dilute solutions of maleic anhydride in either benzene or chloroform. For this purpose he employed concentrations of about 1 in 35. The precipitated product of these reactions was ammonium maleamate from which he obtained the free acid by precipitation by the addition of a mineral acid followed by recrystallisation. Similar procedures were later used by Rinkes (Recueil des Travaux Chimique des Pays-Bas, 45, 819–824 (1926)) and Wasserman (Annalen, 492, 275 (1932)).

This known procedure is however unsatisfactory for the production of maleamic acid on a large scale because the process is troublesome and costly owing to the necessity of isolating the free maleamic acid from its ammonium salt, and also because of the excessive volume of organic solvent employed in the initial preparation of the ammonium maleamate.

We have now discovered that the absorption of gaseous ammonia by solutions of maleic anhydride in such solvents as benzene or chloroform as used by Anschütz, proceeds in two main consecutive stages, firstly the formation of maleamic acid and secondly the reaction of this acid with a further molecule of ammonia to produce ammonium maleamate. Employing the low concentrations of maleic anhydride used by Anschütz, however, it is difficult to stop the reaction when only the first stage is complete, since the second stage proceeds in rapid succession to the first and there seems to be no clearly defined point at which the first stage is complete and the second has not commenced, unless the gaseous ammonia is passed at an extremely slow rate under very carefully controlled conditions, and this of course is not always possible in large scale production. However, we have found that as the initial concentration of the maleic anhydride is increased, so the change from stage one to stage two is accentuated. Using high concentrations, the conversion of the maleic anhydride to maleamic acid proceeds rapidly, whereas the reaction with a further molecule of ammonia is much slower and as a consequence it is easier to stop the reaction after the completion of the former stage. In the case of the employment of very high concentrations of the maleic anhydride (e. g. 1:1 by weight), the formation of ammonium maleamate after the completion of the first stage is extremely slow, so slow in fact that no appreciable proportion of the ammonium salt is produced even when the passage of gaseous ammonia is continued for two to three hours at a reasonable rate after all the maleic anhydride has been converted into maleamic acid. This change however from stage one to stage two ceases to be readily observed when the initial ratio of maleic anhydride to solvent is less than 1:10 by weight.

In addition, we have found that since maleamic acid resinifies when heated (see our application Serial No. 682,280), the temperature used during the preparation of the crystalline acid must be kept below this resinification temperature which is in the region of 140° C.

Accordingly the present invention provides a process for the manufacture of maleamic acid wherein ammonia is passed into a solution of maleic anhdride in an inert organic solvent, the ratio of maleic anhydride to solvent at the commencement of the reaction being at least 1:10 by weight, and the temperature of reaction being below the temperature at which maleamic acid resinifies.

Preferably the ratio of maleic anhydride to solvent is approximately 1:5 by weight and the temperature of reaction between 50° C. and 100° C. We have found that it is necessary, when carrying out preparations in large bulk, to apply cooling water to the outside of the vessels in order to maintain the desired temperature, owing to the exothermic nature of the reaction.

The solvent should be one in which maleic anhydride is readily soluble yet maleamic acid is insoluble or only sparingly soluble. Preferably it is an aromatic hydrocarbon or a chlorinated hydrocarbon, but any inert organic solvent may be used. Examples of such solvents which may be used, and which are commercially available, are xylene, tetrahydronaphthalene, trichlorethylene and dioxane. After removal of the maleamic acid by filtration or other means, the solvent can of course be used again in the preparation of further maleamic acid.

In order to obtain products having a high degree of purity, it is important that the reagents and solvents used should be reasonably dry, and the maleic anhydride reasonably free from maleic (or fumaric) acid. When exceptionally high purity is required it is advisable to use specially dried solvent and ammonia and freshly re-distilled maleic anhydride.

The following examples illustrate how the process of the invention may be carried into effect:

1. 150 gms. of maleic anhydride were dissolved in 375 gms. of xylene and maintained at the temperature of 90° C. in a flask fitted with a reflux condenser and an efficient mechanical stirrer. Dry gaseous ammonia was bubbled into this solution at the rate of approximately 400 ccs. per minute. A fine white crystalline precipitate commenced to form almost immediately. The passage of ammonia was continued until it started to be evolved from the top of the reflux condenser, the reaction then being stopped and the precipitate filtered off, washed with a little xylene and dried. The product, obtained in a yield of 160 gms. possessed a melting point of 162° C. and on analysis was found to contain 12.14% of nitrogen.

2. Example 1 was repeated using a solution of 100 gms. of maleic anhydride in 400 gms. of trichlorethylene. The rate of flow of the gaseous ammonia was approximately 300 ccs. per minute, and during the passage of the gas the temperature of the solution was maintained at 70° C. The product possessed a melting point of 163° C. and was found to contain 12.33% of nitrogen.

3. Example 1 was again repeated, this time using a solution of 70 gms. of maleic anhydride in 560 gms. of tetrahydronaphthalene, ammonia gas being passed at the rate of approximately 300 ccs. per minute. The product possessed a melting point of 164° C. and had a nitrogen content of 11.95%.

4. Example 1 was repeated employing a solution of 80 gms. of maleic anhydride in 320 gms. of dioxane. The flow of gaseous ammonia was approximately 350 ccs. per minute, during which the temperature of the solution, in this case, was maintained at 60° C. The precipitated maleamic acid after washing and drying as before, possessed a melting point of 166° C. and had a nitrogen content of 12.0%.

We claim:

1. A one step process for the direct manufacture of maleamic acid which comprises passing ammonia into a solution of maleic anhydride in an inert organic solvent, the ratio of maleic anhydride to said solvent at the commencement of the reaction being at least 1:10 by weight and the temperature being below the temperature at which maleamic acid resinifies.

2. A one step process for the direct manufacture of maleamic acid which comprises passing ammonia into a solution of maleic anhydride in an inert organic solvent, the ratio of maleic anhydride to said solvent at the commencement of the reaction being at least 1:10 at a temperature between 50° C. and 100° C.

3. A one step process for the direct manufacture of maleamic acid which comprises passing ammonia into a solution of maleic anhydride in xylene, the ratio of maleic anhydride to xylene at the commencement of the reaction being at least 1:10 by weight and the temperature being below the temperature at which maleamic acid resinifies.

4. A one step process for the direct manufacture of maleamic acid which comprises passing dry ammonia into a solution of maleic anhydride in a dry inert organic solvent the ratio of maleic anhydride to said solvent at the commencement of the reaction being at least 1:10 by weight and the temperature being below the temperature at which maleamic acid resinifies.

5. A one step process for the direct manufacture of maleamic acid which comprises passing ammonia into a solution of maleic anhydride free from maleic acid and fumaric acid in an inert organic solvent, the ratio of maleic anhydride to said solvent at the commencement of the reaction being at least 1:10 by weight and the temperature being below the temperature at which maleamic acid resinifies.

RALPH SIDNEY ROBINSON.
ERNST LUDWIG HUMBURGER.

REFERENCES CITED

The following references are of record in the file of this patent:

UNITED STATES PATENTS

| Number | Name | Date |
|---|---|---|
| 2,306,918 | Weiss et al. | Dec. 29, 1942 |

OTHER REFERENCES

Anschütz: Annalen, vol. 259, page 138 (1890).
Rinker: Rec. Trav. Chim., vol. 45, pages 819–824 (1926).
Wasserman: Annalen, vol. 492, page 275 (1932).